United States Patent [19]
Giovannone et al.

[11] Patent Number: 5,795,535
[45] Date of Patent: Aug. 18, 1998

[54] METHOD OF THERMOFORMING PLASTIC ARTICLES

[75] Inventors: Anthony Giovannone, Osterville; David Mitchell, West Barnstable, both of Mass.

[73] Assignee: Sencorp Systems, Inc., Hyannis, Mass.

[21] Appl. No.: 619,810

[22] Filed: Mar. 15, 1996

[51] Int. Cl.⁶ ........................................... B29C 51/10
[52] U.S. Cl. .................. 264/551; 264/553; 264/153; 264/163; 425/302.1; 83/40; 83/41; 83/33
[58] Field of Search .................. 264/153, 163, 264/551, 553; 425/301, 302.1, 307; 83/21, 22, 40, 41, 49, 33

[56] References Cited

U.S. PATENT DOCUMENTS

| | | | |
|---|---|---|---|
| 3,523,474 | 8/1970 | Kinslow, Jr. .......................... | 83/50 |
| 3,640,666 | 2/1972 | Jope et al. ............................ | 264/153 |
| 3,728,062 | 4/1973 | Layman ................................ | 425/291 |
| 3,755,522 | 8/1973 | Jope et al. ............................ | 264/163 |
| 5,451,356 | 9/1995 | Hebert ................................. | 264/163 |
| 5,599,598 | 2/1997 | Valyi ................................... | 264/551 |

FOREIGN PATENT DOCUMENTS

658890 10/1951 United Kingdom ................ 83/41

*Primary Examiner*—Jan H. Silbaugh
*Assistant Examiner*—Edmund H. Lee
*Attorney, Agent, or Firm*—Richard P. Crowley

[57] ABSTRACT

A precut die apparatus arranged and adapted for use in a thermoform-trimming method and system to produce plastic molded articles, and to the method and system in which the apparatus is employed. The precut apparatus is positioned, in the method and system, between the form press and the trim station. The precut apparatus is arranged to precut, in a desired and selected manner, the thermoformed sheet material containing thermoformed articles therein, about the periphery of the thermoformed articles. The precut provides for a bridged and joining area of the sheet material to allow for slight movement and adjusting of the molded articles for precise alignment in the punch and die trim step of the thermoforming and trimming operation.

19 Claims, 5 Drawing Sheets

FIG 5

METHOD OF THERMOFORMING PLASTIC ARTICLES

DESCRIPTION

BACKGROUND OF THE INVENTION

A wide variety of plastic articles may be made by a thermoforming method and system. Typically, a thermoforming system would include a source of a thermoplastic sheet material, such as a roll unwinding station, a heating station to heat the thermoplastic sheet material, and a thermoforming form press station, wherein the heated thermoplastic sheet material is formed by a vacuum-pressure system employing upper and lower platens to thermoform molded articles in the sheet material; for example, a plurality of cup-like food containers. Thermoformed articles, formed in the thermoplastic sheet material in the thermoform press, are then trimmed employing a punch and die arrangement within a trim press, to remove the surrounding support area from each of the thermoformed articles. The system optionally includes a recovery station to recover the molded articles and the scrap material, and may include a stacking and packaging station.

Generally, the thermoform press will form a plurality of thermoformed articles in the sheet material in various rows, while the trim press will trim the articles as indexed into the trim press row by row, or in multiple rows. Where, for example, the thermoformed article comprises a plastic container or dish, such as a deli container or food container, care must be taken to position accurately each row of the thermoformed articles in the trim press, so as to insure accurate centering of the molded article in the sheet prior to trimming, so as to provide for an accurately cut periphery about the outer portion of the food container. Inaccuracy in the trim press, in the trimming of the plastic articles, may, for example, lead to slight flanges or improper fitting of the plastic lid of the food container.

Thermoformed systems are designed to deliver a high volume of quality parts from most major polymers, particularly in sheet form, and which polymers would include high impact polystyrene (HIPS), polypropylene (PP), high density polyethylene (HDPE), oriented polystyrene (OPS), polyethylene terephthalate (PET) and vinyl, and olefins. These or any other thermoplastic polymers may be used, typically in sheet form, and with the sheet form varying in thickness; for example, up to 80–100 mils or higher. It is known that certain plastic materials have a high or irregular shrink rate; such as, for example, some polypropylenes and high density polyethylenes, wherein a great part of the shrinkage; for example, 60–90%, may occur immediately after thermoforming of the article; however, the remaining shrinkage of the article may occur within the next 12 to 24 or more hours. In addition, some polymer materials employed have irregular shrinkage rates depending on their prior history and chemical structure and treatment. These polymers, in particular, when employed in the thermoforming system and method, may create difficulties for accurate trimming for the thermoformed articles from the sheet material in the trim press, since such shrinkage makes it difficult to provide for consistent and accurate reproducible centering of the articles in the trim press.

In view of such difficulties with these polymers, there are available machines that combine a thermoform form press and trim press together, so that polymers with a high-shrink or irregular shrink rate may be quickly thermoformed and trimmed, in a single operation in a single machine. However, such machines and tooling tend to be complex in operation, quite expensive, not wholly satisfactory in overcoming the problems associated with such polymers, and not adapted to be inserted in a regular thermoforming system production line.

It is therefore desirable to provide for a new and improved thermoforming method and system to provide for the accurate alignment and the accurate trimming of thermoformed articles in a sheet material, and more particularly to provide for a separate, single precut apparatus between the form press and the trim press in a regular production line to permit thermoformed articles and sheets to be accurately aligned, centered and trimmed in a punch and die trim press.

SUMMARY OF THE INVENTION

The invention relates to a precut apparatus arranged and adapted for use in a thermoform-trim method and system to produce molded thermoplastic articles, and to the method and system in which the apparatus is employed. The invention further relates to a thermoplastic sheet material to be formed into thermoformed articles, and to the articles so formed.

The present invention is directed to a precut die apparatus, arranged and constructed for use in a thermoforming-trimming method and system, for example, for positioning between the form and trim press, and a system which employs the apparatus and method. The precut apparatus is arranged to precut in a desired and selected fashion the thermoplastic sheet material containing a plurality of thermoformed articles therein from the mold press, and prior to trimming of the molded articles from the thermoformed sheet material. The precut die apparatus of the invention comprises a die platen having a plurality of cutting blades, typically steel rule or machined cutting blades, and extending upwardly, generally perpendicularly, above the surface of the die, and each blade having a first and a second end. The blades are arranged on the die platen with each of the first ends overlapping each of the second ends of the adjoining blade a selected overlap distance, and with each of the blades spaced apart from each other a selected distance. The blades together extend generally about the entire periphery of each of the thermoformed articles to be trimmed by the trim press, and form a cutting line about the periphery with forming stripes attaching the thermoformed article with the inner cut surround area.

In one embodiment, with generally circular molded articles to be trimmed, the first end of one arcuate blade is positioned slightly inside the second end of one overlapping adjoining arcuate blade, and the second end of the one blade is positioned slightly outside the first end of an other arcuate overlapping adjoining blade. The number of inside-outside overlaps may vary, depending on the molded article to be trimmed and its periphery. This arrangement provides a plurality of joining or bridging strips of selected arcuate length and width, with the strip generally arranged uniformly about the periphery of the molded article in the thermoformed sheet. For example, with a circular molded article, the blades may overlap in a generally parallel arrangement to provide for joining strips of uniform width; e.g., $\frac{1}{16}$ to $\frac{1}{2}$ inch or more, and the overlap arranged to provide for joining strips of uniform width; e.g., 1 to 4 inches, or more, with the strips ranging from about as low as three to six or more, depending on the size and nature of the thermoformed article to be trimmed. The strips are formed in the surround area in the thermoformed sheet material; that is, the area of the sheet material which has not been thermoformed, and which retains the thermoformed article in the position in the sheet material, and which surround area becomes generally scrap material after trimming.

The blades of the precut apparatus are arranged in length and spacing to provide, after the precutting operation; that is, after precutting about the periphery of the thermoformed articles and material, for a plurality of adjoining or bridging strips of the sheet material, about the thermoformed article. The length and the width of the adjoining or bridging strips may vary as desired, depending on the nature and thickness of the thermoformed material and the article. The strips are arranged so as to permit, after thermoforming, and prior to introduction into the trim press, a slight movement of the thermoformed articles in the sheet material, for proper alignment of the thermoformed articles in the trim press, so that the article may be accurately and properly aligned and centered prior to employing the punch and die of the trim press, to separate the article from the surrounding sheet material.

It is recognized that the die cutting blades may be arranged in various design patterns, and the joining or bridging strips vary in number, length, width, and uniformity, provided that the joining strips provide for adequate non-movement and stability of the thermoformed articles in the sheet material between the form press and the trim press, and yet permit limited movement of the indexed articles in the trimming operation to provide for precise alignment with the trimming operation; e.g., centering of the molded article before trimming.

The invention comprises a system for the production of thermoformed plastic articles from a thermoplastic sheet material, and which system comprises a sheet material unwind station, wherein the thermoplastic sheet material may be unrolled for use in the system, and a heating station for heating the thermoplastic sheet material, typically heating the top and bottom of the sheet material to a preselected temperature, typically ranging from 200° to 300° F. The preheat station, for example, may employ calrod-type heaters, or quartz heaters. The system further provides for a form or press station, wherein the heated thermoplastic sheet material is subject to thermoforming by upper and lower platens, in order to thermoform, typically by the use of vacuum pressure, a plurality of the thermoformed articles in the thermoplastic sheet material.

The system includes a die precut station, wherein the thermoformed sheet material, with the thermoformed articles formed therein, are subject to a precutting operation, to form a plurality of selected joining strips about at least a portion and preferably about the periphery of each of the thermoformed articles, so as to permit the slight movement of the thermoformed articles in the sheet material sufficient to permit alignment in the subsequent trimming operation.

The system includes a trim press, usually employing a punch and die arrangement for trimming, and which generally aligns selected parts of the thermoformed sheet material; e.g., a row, fed from the precut station to the trim press, so as to trim and center accurately the precut, thermoformed articles in the thermoformed sheets. The system generally includes a recovery station for the recovery and/or stacking and packaging of the trimmed articles and the recovery of scrap material.

The invention also includes a method of producing thermoplastic articles, which method comprises presenting a sheet of thermoplastic material from a source of such thermoplastic sheet material into a heater system for preheating the thermoplastic film material to a selected temperature, and forming the heated thermoplastic material in a form press to form a plurality of thermoformed articles in the thermoplastic sheet material. The articles are typically spaced apart from each other to form a surround area of sheet material about each thermoformed article.

The method includes precutting the surround area about each thermoformed article in the thermoplastic sheet material, so as to form a plurality of joining or bridging strips of the sheet material of selected length and width about the periphery of each article, and trimming the precut thermoformed sheet material using a punch and die trim press. The precut articles in the thermoformed sheet material are adapted to move slightly, so that each of the molded articles, in the trimming step, may be accurately positioned within the die prior to the punching operation of the trim press to remove the article from the surrounding area of the preformed sheet material. The method includes recovering an accurately trimmed thermoplastic article.

The precut apparatus and the thermoforming trimming molding system and method of the invention may be employed with a wide variety of thermoplastic materials to make various thermoformed articles, including, but not limited to, those type of thermoplastic materials, for example, in sheet form, which shrink over a period of time or shrink irregularly or unpredictably, or which provide for any difficulties in connection with the accurate trimming of the articles in the trim press, by virtue of the nature, thickness or material of the thermoplastic material, or the shape of the article, and may be used overall with regular, uniform shrink polymers to insure accurate trimming.

The invention is also directed to a precut thermoformed sheet material with molded articles in the sheet material with a selected cutting pattern about the periphery of the articles, and forming adjoining or bridging strips about the molded articles and in the selected pattern, so as to permit the slight movement of the articles in any trimming operation.

The invention includes a thermoplastic sheet material which has a plurality of thermomolded articles therein, the articles spaced-apart generally uniformly from each other. The surround area about at least a portion of each thermoformed or molded article, and generally uniformly positioned about the periphery of each article, includes joining or bridging strips of defined width and length, preferably of uniform length and width to permit slight movement of the thermomolded articles in a subsequent trimming operation to align, for example, to center the article for an accurate trimming operation. Generally, the joining strips have a diecutting line about the entire periphery of the article, which diecutting line forms one side of the joining strip. Usually, the joining strips are arranged so that such strips do not extend about the entire circumference of the article, but are positioned and arranged, if extended, to surround the article. Where desired, the precut thermomolded article in the sheet material may be stored and subsequently trimmed in a different location, where the trimming does not follow the thermoform press station. The joining strips retain the molded articles to the thermoformed sheet material after the precut die station.

The use of the invention, in particular the precut apparatus, is particularly desirable where thermoforming articles are desired which require very close and accurate tolerances; for example, but not limited to, where plastic food containers must be trimmed and lids affixed to the plastic food containers.

It is recognized that the precut die apparatus employed includes a die platen having upright, perpendicular steel rule or machined dies as cutting blades, and another flat striking platen. The steel rule or machined dies may have the blades arranged in different arrangements and designs for different types of precut patterns and joining strips. The precut die employs a plurality of cutting blades, at least three cutting blades, and the blades should be arranged to cut about the periphery of the surface of each thermoformed article in the sheet. Each end of the blade should overlap an adjoining end of the other blade, and the overlap may vary, for example, from about 5 to 50%, such as 10 to 30%. The spacing between the blades may also vary, and be non-uniform or uniform, but typically the space can range from about $^{1}/_{16}$–$^{1}/_{2}$ inch, more typically about $^{1}/_{8}$–$^{1}/_{4}$ inch. Generally, the blades are placed so that they are parallel in the overlapping section of the blades, so as to provide for, in one embodiment, generally uniform joining or bridging strips around the surround area of the sheet material, with a diecut line about the periphery of the thermoformed article.

The joining or bridging strips should provide for the thermoformed articles in the sheet material to be slightly flexible, and to permit alignment of a particular article with the punch and die in the trim press. The joining or bridging strips shall hold the thermoformed article in the sheet material, so that after rearrangement of a strip of the sheet material; e.g., across one line of articles in the trim press, the articles may be slightly moved by virtue of the precutting pattern about the article, and centered for trimming by the guide means in the trim press. Thus, the precut die pattern employed in the apparatus may assume various helical, spiral and curved forms, various types of adjoining, and various shapes and sizes of the joining and bridging strips about the article.

A prior art thermoformer system with a material unwind stand, heater stand, form press, trim station and optional stacker stand is illustrated and described for example, in "2500 Series" Bulletin, and the trim press illustrated and described in "Model PT30" Bulletin, both of Sencorp Systems, Inc., Hyannis, Mass., hereby incorporated by reference.

The invention will be described for the purposes of illustration only in connection with the manufacture of a thermoformed plastic container, such as a food container; however, it is recognized that various modifications, changes and additions in the embodiment, as disclosed and illustrated, may occur to those persons skilled in the art, all falling within the spirit and scope of the invention.

BRIEF DESCRIPTION OF THE DRAWINGS

FIG. 3 is a partial perspective view of sections of a thermoformed sheet material, with FIG. 3A showing the molded articles in the thermoformed sheet prior to introduction into the precut station.

FIG. 5 shows enlarged cutaway sectional views of the trimming step, with an article guide orienting the precut, molded piece into the correct die cut position, with FIG. 5A showing the system in the open non-trimming position and FIG. 5B showing the system in the closed, trimming position.

DESCRIPTION OF THE EMBODIMENTS

Figure 1:
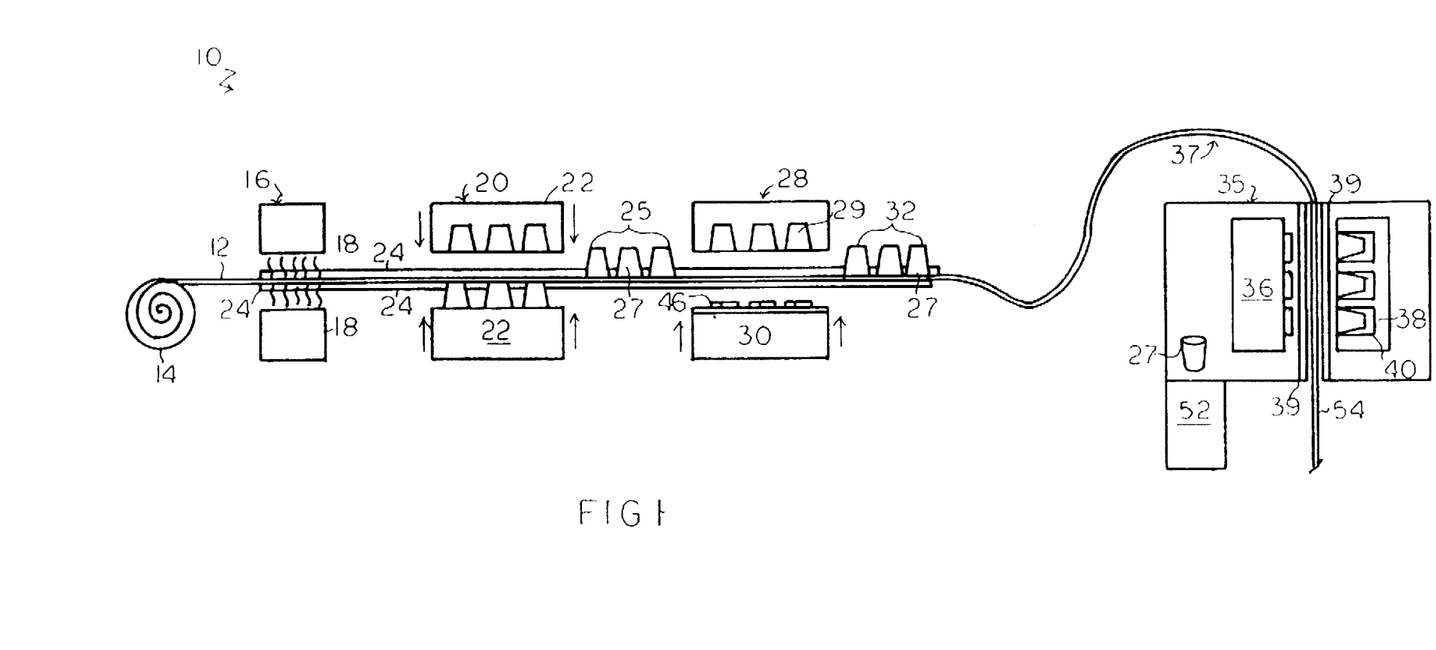
FIG. 1 is a schematic illustration of the thermoforming system of the invention.

FIG. 1 shows a schematic representation of a thermoforming and cutting system 10. A thermoplastic sheet material 12, like PET or PP at 40–60 mils/thickness, is unwound from a large roll 14 and continuously fed by an index chain or belt 24 into a heat station 16, where quartz or calrod-type heaters 18 heat the sheet material 12 on both sides, to 225°–275° F., prior to entry into the press station 20. A mold press 22 thermoforms and molds articles 27 in the sheet material 12, to create a unit of molded articles 25. The units 25 are then continuously indexed into a precut station 28, where the precut die apparatus of the invention 30 precuts the articles 27 in the unit 25.

The articles 27, still attached to the thermoformed sheet material 12, are then index-fed in precut units 32 over a feed canopy 37 and into feeder guides 39 of the punch and die trim station 35. After the articles 27 are positioned by guides 40 and trimmed by the punch 38 and die 36 in the trim station 35, the trimmed articles 27 are stacked in a stacker 52 and the unused thermoplastic sheet material 54 removed.

Figure 2:
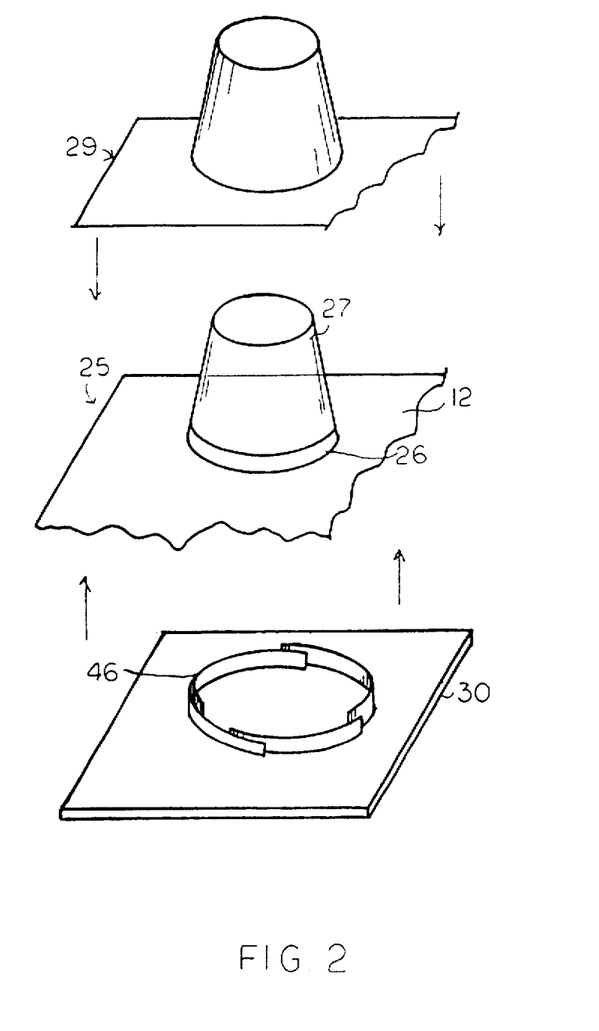
FIG. 2 is an enlarged, schematic perspective illustration of the precutting station of the system of FIG. 1.

FIG. 2 shows a cutaway, perspective view of a thermoformable sheet material 12, with a molded article 27 in a thermoformed unit 25. The precut die apparatus 30 is positioned to precut, by means of moving peripherally positioned blades 46 against the periphery 26 of the molded article 27 in the thermoplastic sheet material 12, with the striking platen 29 working with the lower precut die apparatus 30.

Figure 3A:
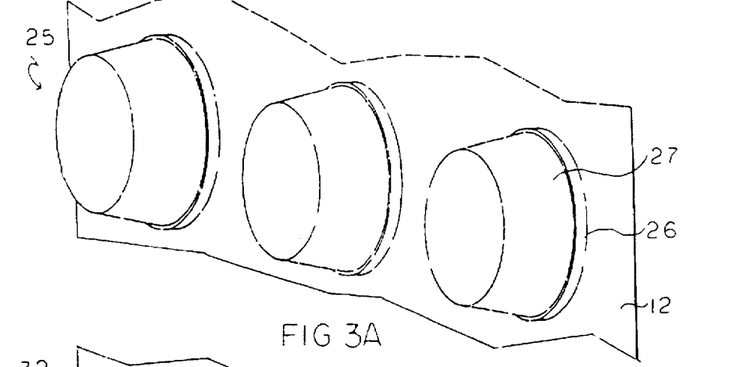
Figure 3B:
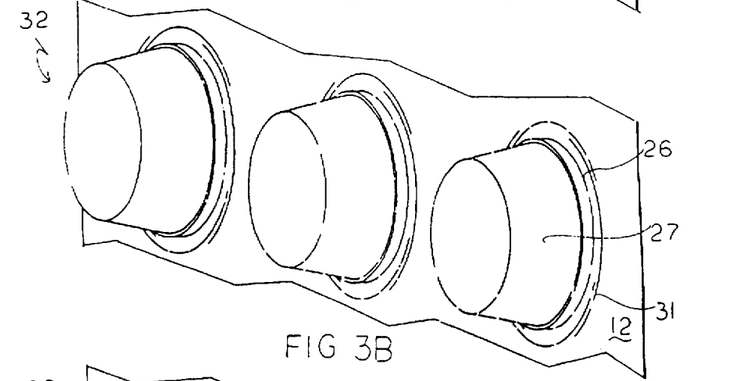
FIG. 3B showing the molded articles with the precuts thereabout.
Figures 3C, 3D:
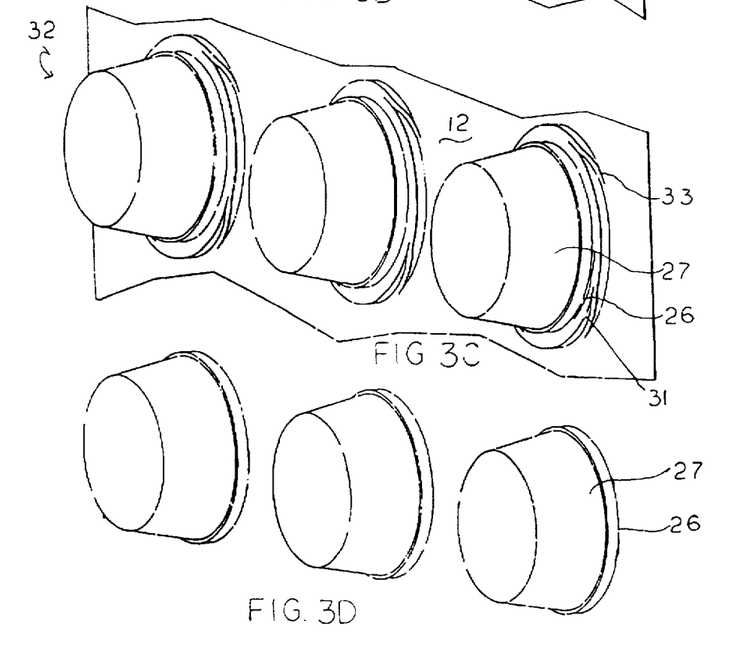
FIG. 3C showing the precut spaces created by slight movement of the precut molded articles in the sheet material.
FIG. 3D showing the finished trimmed molded article.

FIG. 3 shows in partial cutaway perspective view the thermoformed articles and precut process of the invention, with FIG. 3A showing the thermoformed molded article 27 in the sheet material 12 subsequent to the molding process, in a thermoformed unit 25. FIG. 3B shows the molded articles 27 with the precut 31 made by blades 46 of the apparatus of the invention 30 (shown in FIG. 2), forming a precut unit 32. FIG. 3C shows the molded articles 27, in the precut unit 32, in a slightly removed position from the sheet material 12, with precut spaces 33 formed by the precuts 31, allowing slight movement of the article 27, while still retaining the article to the sheet material. FIG. 3D shows the finished trimmed article 27 with periphery 26.

Figure 4:
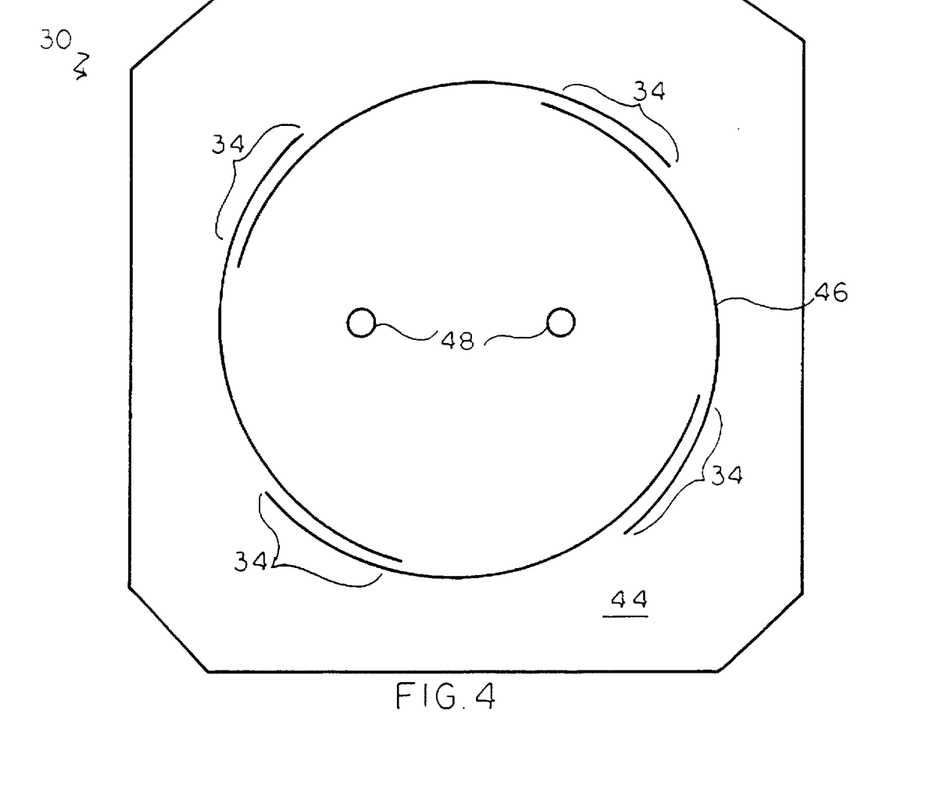
FIG. 4 is a top plan view of the precut die platen of FIG. 2.

FIG. 4 shows a top plan view of the precut die apparatus of the invention 30 with cutting blades 46 having overlap section 34 to form adjoining bridges, attached to a base 44. The base is removably attached to the precut station 28 (shown in FIG. 1) by fasteners 48.

Figures 5, 5B:
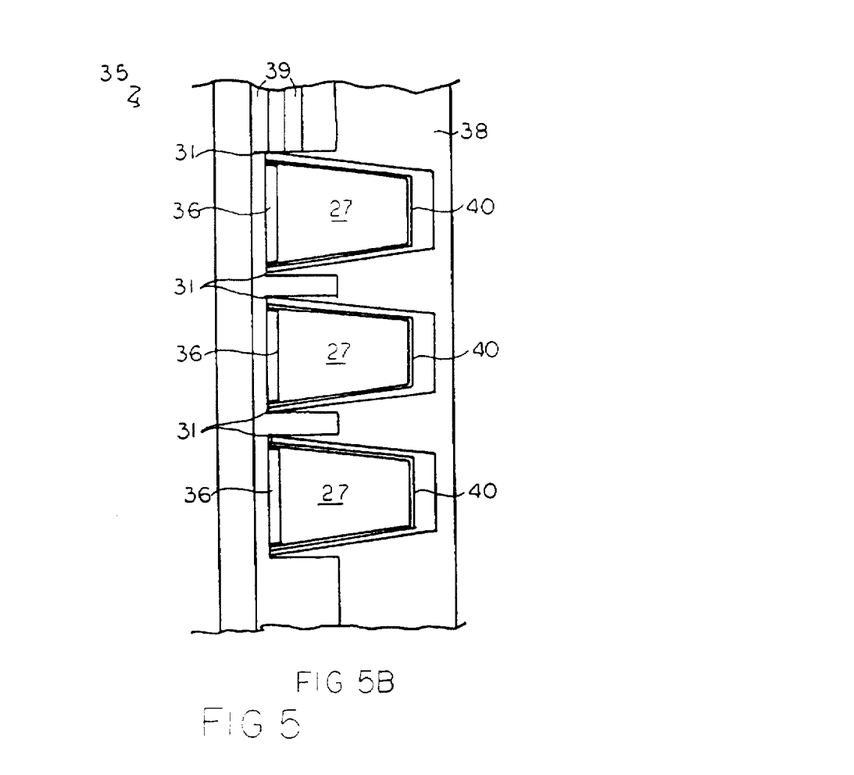
Figure 5A:
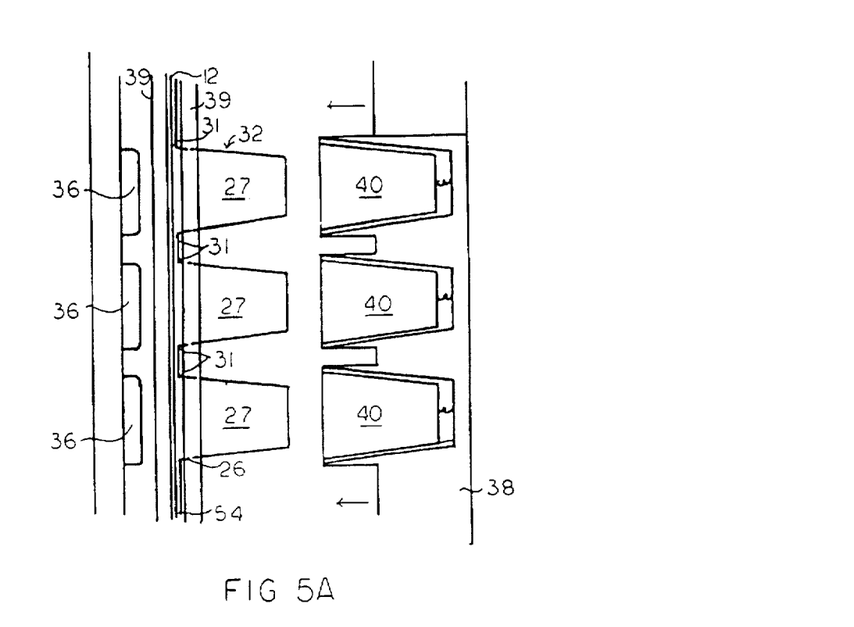

FIG. 5 shows in further detail the trim station 35 of the thermoforming and cutting system of FIG. 1. The precut molded unit 32 of the sheet material 12, with molded articles 27 molded therein, is fed by index chain 24 into the feeder guides 39. The feeder guides 39 position generally the precut molded sheet material unit 32 between the stationary die 36 and the moveable punch 38. Removable spring-loaded article guides 40 precisely guide and orient the molded article 27 to the exact position necessary in the punch and die system for proper and precise trimming of the periphery of the molded article 27. Slight movement and precise alignment of the molded article 27 is allowed by the precuts 31 about the periphery 26 of each molded article 27. After trimming, the molded articles 27 are recovered and the scrap material 54 is collected for reuse.

In operation, a continuous roll 14 of thermoplastic sheet material 12 is unwound and fed onto an indexing belt 24 which feeds the material into a heat station 16. Optionally, a thermoplastic extruded foam material may be continuously extruded and fed into the thermoforming and cutting system.

The thermoplastic material used in this method and system may include, but not be limited to, HIPS, PP, HDPE, OPS, PET, vinyl and most major polymers.

In the heat station 16, top and bottom heaters 18, such as calrod pre-heaters, heat the material 12 to a temperature of from 200° to 300° F. to allow for molding of the pieces by the mold press 22 in the press station 20. Other heaters that may be used include black faced quartz heaters and heaters of varying lengths.

Molding or forming of the articles is accomplished with a heavy duty four-post, four-point toggle operated press with upper and lower moving platens. The return strokes of both platens are independently controlled by adjustable stops and decelerating valves. A standard crank motor, or optionally a servo motor, locates the press in the index direction. As the thermoplastic material is molded in the thermopress station 20, it cools and shrinks a certain amount. While the majority of the cooling and shrinking takes place immediately upon thermoforming, it is recognized that additional and further cooling and shrinking takes place during and after the entire process.

The pieces are molded in the press station 20 in rows of two or three articles or more, and in units of rows, such as units of three or four or more rows of articles, comprising a unit of, for example, three rows with three molded articles in each row. These units, or "shots", may vary in size and composition depending on the size and shapes of the thermoformed articles.

After the articles are molded, the shots of thermoformed articles are indexed by the index belt 24 into the precut station 28. In the precut station, the precut die apparatus of the invention 30 is moved upwardly against an upper platen 29 and the blades 46 cut through the sheet material 12 to form a precut 31 about the periphery 26 of each of the molded articles 27 in the shot 25. These precuts 31 create a precut shot 32 that permits slight movement of the molded articles 27, to allow for precise alignment in the trim station 38.

While it is recognized that this process comprises a separate mold press station and precut station, it is optionally possible for the molding and precutting step to be performed in one step in a combined mold/press form and precut station.

The thermoformed and precut material, which is still cooling and shrinking a certain amount, is then fed over a canopy 37 and into a feed advance guide 39, which feeds the shots 32 into the trim station 35. The canopy 37 is constructed of rods curved in a precise arc shaped to feed the shot 32 freely into the trim station 35. The shots 32 are positioned within the punch and die, with the stationary die 36, which is a stationary vertical die, and the moveable punch 38. One or multiple rows of parts are punched at each cycle. The diecut press has a removable spring article guide 40, which guide positions the molded articles exactly over the stationary die 36 for precise cutting. The precut spaces 33 created by the precuts 31 allow for precise alignment of the articles, which molded articles may have undergone additional shrinkage, which may affect their exact fit into the diecut surface. The trim platen delivers total press power of 12½ tons (11,340 Kg) through the mechanical linkage to the drive shaft.

After the articles 27 are positioned and trimmed, they are removed to a stacker 52, and optionally a packager as desired. The remaining sheet material 54 is recovered for recycling and reuse.

Thus, the precut die apparatus of the invention provides for adjusting and slight flexibility of positioning of the molded article in the die cut step. This flexibility, or slight movement, is necessary and important in a system where thermoplastic material experiences additional or unpredictable shrinkage in a thermoforming process. The precut method of the invention avoids the waste and inefficiency caused by disoriented thermoformed articles due to irregular shrinkage of the material used.

This precut method allows for the use of a wider variety of thermoplastic materials in a thermoforming and cutting process. As with all other components of the thermoforming and cutting system, the precut die apparatus of the invention is removable and replaceable, and may be used separately, and the precut thermoformed sheet material fed later into a trim press or placed between a trim press and trim station on a thermoforming production line.

What is claimed is:

1. A method for the production of a plastic article from a thermoplastic sheet material in a thermoforming operation, which method comprises:

a) providing a thermoplastic sheet material;

b) heating the thermoplastic sheet material to a selected temperature to form a preheated thermoplastic sheet material;

c) thermoforming the preheated thermoplastic sheet material in a thermoform press, forming a plurality of thermoformed articles having an outer periphery in the sheet material, the articles formed in a spaced-apart arrangement from each other in the sheet material, and to define a surround area of the sheet material about each article;

d) trimming in a diecutting trim press the thermoformed articles from the sheet material, and e) recovering accurately cut plastic articles from the trim press at a recovery station, the improvement which comprises:

precutting in a striking operation about the outer periphery of each of the thermoformed articles employing a die platen with a plurality of spaced apart overlapping cutting blades and a striking platen to form, in the surround area of each of the articles, a plurality of overlapping diecut lines and elongated, spaced apart joining strips of selected length and defined width between ends of the overlapping diecut lines, the diecut lines extending about the outer periphery of each of said articles, the joining strips to provide for retaining the thermoformed articles in the sheet material and to permit a slight movement and accurate alignment of the thermoformed articles in the trimming step.

2. The method of claim 1 which includes holding each of said articles during the striking operation by means of an article-receiving space in the striking platen.

3. Claim The method of claim 1 which includes spacing said overlapping cutting blades generally uniformly apart from each other to form joining strips of uniform width.

4. The method of claim 1 which includes overlapping said cutting blades to an extent of about 5–50% at each end over adjoining blades.

5. The method of claim 1 which includes providing a uniform number of cutting blades, a first end of one blade overlapping within an interior surface at a second end of another blade, and an exterior surface at a second end of one blade overlapping a first end of another adjoining blade.

6. The method of claim 1 which includes forming a plurality of generally arcuate diecut lines extending about the outer periphery and a plurality of arcuate joining strips generally uniformly spaced apart about a generally circular article.

7. The method of claim 1 which includes spacing said cutting blades apart an overlapping width distance of about 1/16 to 1/2 inch.

8. The method of claim 1 which includes providing a trim press with a spring-biased guide die and punch.

9. The method of claim 1 which includes feeding vertically into a trim press an indexed row of precut thermoformed articles in the thermoplastic sheet material.

10. The method of claim 1 which includes recovering finished, molded articles and recovering scrap materials from the surround area.

11. The method of claim 1 which includes thermoforming and precutting in a single operation.

12. The method of claim 1 wherein the thermoplastic sheet material comprises a thermoplastic polymer characterized by shrinkage at a high or irregular shrink rate after thermoforming, which shrinkage substantially occurs up to 24 hours after thermoforming.

13. The method of claim 1 wherein the thermoplastic sheet material comprises polypropylene or a high density polyethylene.

14. The method of claim 1 which includes precutting to form a plurality of about three to six joining strips of 1 to 4 inches in length.

15. The method of claim 1 which includes guiding and centering the precut plastic articles in the sheet material in the diecutting trim press employing spring loaded guides.

16. A method for the production of a plastic article from a thermoplastic sheet material in a thermoforming operation, which method comprises:

a) providing a thermoplastic sheet material;

b) heating the thermoplastic sheet material to a selected temperature to form a preheated thermoplastic sheet material;

c) thermoforming the preheated thermoplastic sheet material in a thermoform press, forming a plurality of thermoformed articles having an outer periphery in the sheet material, the articles formed in a spaced apart arrangement from each other in the sheet material, and to define a surround area of the sheet material about each article;

d) trimming in a diecutting trim press the thermoformed articles from the sheet material, and e) recovering accurately cut plastic articles from the trim pres at a recovery station, the improvement which comprises:

forming in the surround area about each thermoformed article a plurality of separate, generally arcuate cut lines, which in total surround the outer periphery of each thermoformed article, and which cut lines are spaced apart and overlap at each end an adjacent cut line to form a plurality of separate spaced apart, generally arcuate joining strips of selected width and length to provide for slight movement and accurate alignment of the thermoformed articles during trimming.

17. The method of claim 16 which includes forming the cut lines and joining strips by precutting the sheet material employing a striking platen and a die platen.

18. The method of claim 16 which includes forming the joining strips in a generally uniform spaced apart arrangement about the thermoformed articles, all the joining strips of generally uniform length and width.

19. The method of claim 16 which includes overlapping the ends of the cut lines in an amount of from about 5 to 50 percent of the length of the cut lines.

* * * * *